United States Patent [19]

Mancini

[11] Patent Number: 5,225,462
[45] Date of Patent: Jul. 6, 1993

[54] BITUMEN-POLYMER MIXTURES AND A PROCESS FOR THEIR PREPARATION

[75] Inventor: Giuseppe Mancini, Melegnano, Italy

[73] Assignee: Euron S.p.A., Milan, Italy

[21] Appl. No.: 825,141

[22] Filed: Jan. 24, 1992

[30] Foreign Application Priority Data

Jan. 24, 1991 [IT] Italy .................. MI 91-A/000169

[51] Int. Cl.$^5$ .............................................. C08L 95/00
[52] U.S. Cl. ........................................ 524/59; 524/68; 524/69; 524/70; 524/71
[58] Field of Search ............... 524/59, 68, 69, 70, 524/71

[56] References Cited

U.S. PATENT DOCUMENTS

| | | | |
|---|---|---|---|
| 3,615,830 | 10/1971 | Johnson | 136/6 |
| 3,915,914 | 10/1975 | Binder et al. | 260/28.5 |
| 4,217,259 | 8/1980 | Bresson | 260/28 |
| 4,576,648 | 3/1986 | Demangeon et al. | 524/59 |
| 4,585,816 | 4/1986 | Vitkuske et al. | 524/68 |
| 4,873,275 | 10/1989 | Moran et al. | 524/68 |

FOREIGN PATENT DOCUMENTS

| | | |
|---|---|---|
| 2265823 | 10/1975 | European Pat. Off. . |
| 0300788 | 1/1989 | European Pat. Off. . |
| 56-115354 | 10/1981 | Japan . |
| 1508420 | 4/1978 | United Kingdom . |

OTHER PUBLICATIONS

Derwent Publications Ltd., London, Database WPIL Accession No. 81-78567D; JP-A-56 115 354 Asahi Chemical Ind.—Abstract.

Primary Examiner—Paul R. Michl
Assistant Examiner—Olga Asinovsky

[57] ABSTRACT

A process for preparing bituminous mixtures with added thermoplastic polymer is described, the mixtures having storage stability and improved general properties.

The process consists of treating the bitumen-polymer mixtures with an unsaturated dicarboxylic aliphatic acid or with the relative anhydride.

15 Claims, No Drawings

BITUMEN-POLYMER MIXTURES AND A PROCESS FOR THEIR PREPARATION

This invention relates to a process for preparing bituminous mixtures with added thermoplastic polymer, the resultant mixtures possessing storage stability and improved properties. The process consists of treating the bitumen and polymer with an unsaturated dicarboxylic aliphatic acid or an anhydride thereof. Modifying bitumen with polymers and in particular with thermoplastic polymers is a procedure widely used for improving the applicational characteristics of the bitumen, and in particular its flexibility, its elastic properties at low temperature, its resistance to high temperature deformation, its adhesion and cohesion characteristics and its durability.

For example, U.S. Pat. No. 4,217,259 teaches the use of symmetrical radial copolymers consisting of diene and aromatic vinyl blocks; U.S. Pat. No. 4,585,816 teaches the use of block copolymers of a monoalkenylaromatic and a conjugated diolefin; U.S. Pat. No. 3,915,914 teaches the use of 1-butene homopolymers and copolymers; U.S. Pat. No. 3,615,830 claims homopolymers of isoolefins, particularly polyisobutene.

UK patent 1,508,420 describes mixtures of a bitumen, having carboxylic and/or anhydride groups, with a) a copolymer (1) having the same functional groups, and/or (b) a copolymer (2) having at least two functional groups other than carboxylic. Then coupled mixtures are prepared by reaction of the mixture of modified bitumen and copolymer (1) with metal compounds or by reaction of the modified bitumen with the copolymer (2).

The mixture of modified bitumen and copolymer (1) can be conveniently prepared by reaction of maleic anhydride with a mixture of non-modified bitumen and non-modified copolymer.

The most effective polymer additives seem to be styrene-diolefin block copolymers, particularly styrene-butadiene and styrene/isoprene. Japanese patent application No. 115354/81 describes bituminous compositions treated with a block copolymer modified with a dicarboxylic acid or a derivative thereof.

The bitumen-polymer mixtures obtained in this manner have better characteristics than bitumens as such, but in contrast have the drawback of being physically incompatible. This incompatibility manifests itself as poor storage stability of such bitumen-polymer mixtures, which with the passage of time form a two-phase system, in which the upper phase is rich in polymer and the lower is rich in bitumen.

These drawbacks have so far limited the widespread use of polymers in formulating bitumens, in that the phase separation of the components, which occurs rapidly under normal storage conditions at 120°-180° C., makes it impossible to use such mixtures other than immediately after their formation.

It has now been found that storage-stable bitumen-polymer mixtures can be obtained by reaction of bituminous mixtures containing a thermoplastic polymer, and particularly a vinylaromatic-diolefin block copolymer, with a dicarboxylic aliphatic acid, or an anhydride thereof, using selected reaction conditions and particularly selected values of temperature.

In accordance therewith a first aspect of the present invention is a process for making bitumen mixtures with added thermoplastic polymer storage stable and at the same time improving their general characteristics, the process consisting of interacting the bitumen-polymer mixtures with an unsaturated dicarboxylic aliphatic acid or an anhydride thereof, in an inert environment, at a temperature of at least 190° C. until stable mixtures are obtained.

The stable mixtures obtained in this manner are characterised by improved general properties and oxidation stability; they can be used as such or advantageously diluted with further fresh bitumen, so obtaining mixtures with a low additive content but which are equally storage stable.

The three components (bitumen, polymer, unsaturated acid or anhydride) can be all mixed together virtually simultaneously, or the mixing can be done with successive additions.

In the preferred embodiment of the present invention the acid (or relative anhydride) is added to the bitumen, followed by the thermoplastic polymer.

In a further preferred embodiment of the present invention, the polymer is added to the bitumen, the acid (or relative anhydride) then being added after an adequate time.

Unsatisfactory results are obtained if a thermoplastic polymer previously treated with the same unsaturated dicarboxylic aliphatic acid or an anhydride thereof is added to the bitumen. The temperature at which the process of the present invention is conducted is between 190° C. and 240° C., the optimum temperature also depending on the fluidity of the the bitumen.

The time for the reaction between the polymer, bitumen and acid (or relative anhydride) is generally between 2 and 6 hours, also depending on the selected temperature of reaction.

Both the initial bitumen and that subsequently added for possible dilution are of the type normally used for road application and can be the same or different, and chosen on the basis of suitable applicational criteria. They can be prepared by mixing together different bitumens or bitumens and other products of either petroleum or non-petroleum origin.

According to the present invention, the polymer to be added to the bitumen pertains to the thermoplastic elastomer class and is a block copolymer consisting of blocks of vinyl-aromatic monomer units and blocks of conjugated diene monomer units, the polymer preferably being a block copolymer consisting of polystyrene blocks and blocks of a polymerized unsaturated diene, preferably polybutadiene, the proportion of polystyrene blocks being between 20% and 40% and preferably between 25 and 35%.

The molecular weight of this block copolymer is generally between 50,000 and 1,000,000, and preferably between 100,000 and 800,000. The useful quantity of polymer to be added is between 4 and 15% by weight. Larger quantities are not advisable, as they increase the system viscosity to unacceptable values. One could however start from such high percentages and reduce the system viscosity by using intrinsically more fluid bitumens or fluidifying agents normally included in the various industrial bitumen production methods.

In the preferred embodiment of the present invention the unsaturated dicarboxylic aliphatic acid (or the relative anhydride) is maleic acid or maleic anhydride, the useful quantity of this substance being between 2 and 12% by weight.

The unsaturated anhydride (or the corresponding unsaturated dicarboxylic acid) probably acts as a compatibility agent by promoting interaction between the mixture components. In any event this treatment eliminates any bitumen-polymer incompatibility responsible for their separation, the result being a mixture which is storage stable, possesses improved rheological characteristics and improved stability to oxidation.

In accordance therewith, a second aspect of the present invention is a storage-stable bitumen-polymer mixture prepared by interacting, under the aforedescribed conditions, a bitumen with:

a polymer pertaining to the thermoplastic elastomer class, preferably a styrene-conjugated diene block copolymer, and with an unsaturated dicarboxylic aliphatic acid (or the relative anhydride).

The stable bitumen-polymer mixture thus obtained by treatment with the acid (or relative anhydride) can incorporate other additives according to the final use. If for example the bituminous composition is to be used for coating, fillers, pigments, flame retarders etc. can be incorporated.

The stable bitumen-polymer mixture of the present invention is however most effective in road surfacing, this being its main use. In this application, the bitumen-polymer mixture is mixed with mineral aggregates of suitable particle size.

The following examples are given to better illustrate the present invention.

EXAMPLE 1

Mixtures of High Polymer Content

Stable bitumen-polymer mixtures of high polymer content are preferably prepared by the following procedure. The reactive substance and the polymer are added to the hot bitumen. The mixture is maintained at a temperature of 190°–200° C. in a nitrogen atmosphere for a total time of 2–5 hours. The quantity of dicarboxylic aliphatic acid (or relative anhydride) is between 2 and 10% by weight and the polymer quantity is between 4 and 15%. A slight modification to this procedure consists of previously dispersing the polymer in the bitumen or about 15 minutes and then adding the anhydride (or relative acid). The mixture obtained in this manner is kept stirred for about 4 hours at a temperature of about 190°–200° C.

The following characteristics of the final mixtures were determined: penetration at 25° C. by the ASTM D5 method, ball-ring softening point in °C. by the ASTM D36 method, and in some cases the Fraass brittle point in accordance with I.P. No. 80. The storage stability of the mixtures is determined by filling cylindrical containers with the mixture under examination and storing them temperature-controlled in an inert atmosphere. After a certain time period the softening point of the top and bottom layers is measured. The mixture is more homogeneous the closer together the two softening points.

Mixture A 9 wt % of an SBS (styrene/butadiene/styrene) block copolymer of weight-average molecular weight 230,000 containing 30% of polystyrene blocks and 70% of polybutadiene blocks are added together with 7% of maleic anhydride to a 180/200 grade bitumen. The mixture is kept at 190° C. for 15 minutes, stirring with a turbine mixer. It is then kept under normal stirring at 190° C. for two hours under nitrogen.

The penetration of the product obtained is 55 dmm. After 72 hours of storage at 170° C. the top and bottom softening points are measured, these being 133° and 132° C. respectively, showing that the mixture is stable, i.e. has undergone no separation or sedimentation phenomena.

Mixture B

9% of the SBS block copolymer used in Example 1 and 7% of maleic anhydride are added to a 180/200 grade bitumen. The mixture is kept at 190° C. for 15 minutes, stirring with a turbine mixer. Normal stirring is continued for 1 hour at 190° C. while bubbling nitrogen through to eliminate excess maleic anhydride. It is then kept for a further hour at 190° C. in a nitrogen atmosphere. The characteristics of the bituminous mixture are:

penetration: 70 dmm;
Fraass brittle point: −25° C.;
softening point after 72 hours at 170° C.: top 120° C., bottom 118° C.

Again in this case the negligible difference between the softening points demonstrates the storage stability of the mixture.

Mixture C

9% of SBS and 3% of maleic anhydride are added to a 180/200 grade bitumen.

The mixture is kept stirring for 4 hours at 200° C. in a static nitrogen atmosphere and for 1 hour at 200° C. under a nitrogen flow. The penetration of the mixture obtained is 62 dmm. The softening point after 72 hours of storage at 170° C. is 104° C. for both the top and bottom.

Mixture D

The procedure for preparing mixture C is followed, but adding 6% of maleic anhydride and 6% of SBS. The final mixture has the following characteristics:

penetration: 75 dmm;
Fraass brittle point: −20° C.;
softening point after 72 hours at 170° C.: top 118° C., bottom 118° C.

Mixture D bis 200 grams of 180/200 bitumen are treated with 13.6 grams of SBS and 14.2 grams of maleic acid at 200° C. for 4 hours in a nitrogen atmosphere and for 1 hour while bubbling nitrogen through. The resultant product has the following characteristics:

penetration: 71 dmm;
ball ring; 119;
penetration index: 9.24;
softening point after 72 hours of storage at 170° C.: top 120° C., bottom 123.8° C.

The merely slight difference in the softening points indicates that no component separation has taken place.

EXAMPLE 2

Mixtures of low polymer content. These mixtures are prepared by the following procedure. The bitumen is heated, the polymer and maleic anhydride (or maleic acid) are added, and the mixture is kept under reaction for a time of between about 4 hours and about 6 hours maintaining the temperature at 190°–200° C. The quantity of maleic anhydride (or maleic acid) used is between 4 and 6% and the polymer between 8 and 12% by weight of the final mixture. The product obtained can be used as such, given its excellent characteristics, or can be diluted with a variable quantity of fresh bitumen, as shown by the following examples.

A particularly advantageous modification is to add the polymer to the bitumen, which has been heated under nitrogen to a temperature of between 200° and 240° C., and keep the mixture stirring for about 30 minutes to completely homogenize the polymer. The anhydride (or the relative acid) is then added over a period of about 5 minutes and allowed to react for about 2 hours, the mixture obtained then being diluted with fresh bitumen and kept stirring for a further 15 minutes.

Mixture E

6% of maleic anhydride and 9% of SBS are added to a 180/200 grade bitumen.

The mixture is kept stirring for 4 hours at 200° C. in a nitrogen atmosphere and for a further 2 hours at 200° C. but under a nitrogen flow.

A further 50 parts of 180/200 bitumen are added to 100 parts of the mixture obtained. The final mixture is homogenized for some minutes under stirring.

The final characteristics are as follows:
penetration: 78 dmm;
softening point: 112° C.
penetration index: +8.98;
Fraass brittle point: −22° C.;
softening point after 72 hours of storage at 170° C.: top 113° C., bottom 112° C.

Mixture F

A further 50 parts of 180/200 bitumen are added to 200 parts of the product of Mixture E. This new mixture is homogenized by stirring while hot for some minutes.

The final characteristics are as follows:
penetration: 92 dmm;
softening point: 96° C.
penetration index: +8.06;
softening point after 72 hours of storage at 170° C.: top 96° C., bottom 96° C.

Mixture G 50 parts of 180/200 bitumen and 50 parts of 80/100 bitumen are added to 200 parts of the product of Mixture E. This new mixture is homogenized for some minutes.

The final mixture has the following characteristics:
penetration: 95 dmm;
softening point: 91.5° C.
penetration index: +7.69;
softening point after 72 hours of storage at 170° C.: top 92° C., bottom 91° C.

Mixture H

4% of maleic anhydride and 9% of SBS are added to a 180/200 grade bitumen. The mixture is stirred with a turbine mixer for 15 minutes at 190° C. in a nitrogen atmosphere. It is maintained for a further 2 hours at 200° C. under normal stirring in a nitrogen atmosphere and is finally kept for 2 hours at 200° C. under under a nitrogen flow. The product obtained is diluted in a 1/1 ratio with further 180/200 bitumen.

The following characteristics are obtained:
penetration: 110 dmm;
softening point: 100° C.
penetration index: +9.05;
softening point after 72 hours of storage at 170° C.: top 98° C., bottom 97° C.

Mixture I

The procedure for the preparation of mixture H is followed. The stable bitumen-polymer mixture is then diluted with two parts of 180/200 bitumen.

The following characteristics are obtained:
penetration: 134 dmm;
softening point after 5 days of storage at 170° C.: top 62° C., bottom 61° C.

Mixture L

The procedure for the preparation of mixture H is followed. The stable bitumen-polymer mixture is then diluted with one part of 80/100 and one part of 180/200 bitumen. The final mixture has a SBS content of 3% and a maleic anhydride content of 1.3%.

The following characteristics are obtained:
penetration: 102 dmm;
softening point: 86° C.;
Fraass brittle point: −18° C.;
penetration index: 7.31;
softening point after 5 days of storage at 170° C.: top 88.5° C., bottom 87.5° C.

Mixture M

SBS (8.1 parts by weight) is added to a 180/200 bitumen (88.3 parts by weight) and the mixture kept stirring at 225° C. in a nitrogen atmosphere until the polymer is completely homogenized. Maleic anhydride (3.6 parts by weight) is then added and the mixture reacted for 2 hours at 225° C. in a nitrogen atmosphere. One part of the product obtained is diluted with 3.5 parts of 80/100 bitumen, maintaining stirring for 20 minutes at 170° C.

A bitumen is obtained with the following characteristics:
penetration at 25° C.: 86 dmm;
softening point: 53° C.;
penetration index: 1.0;
Fraass brittle point: −15° C.;
after 15 days storage at 170° C., the softening point of the top is 51.9° C. and of the bottom is 51.6° C.

The mixture obtained is also stable to oxidation as demonstrated by the following data:
viscosity at 60° C.: 3170 P;
viscosity at 60° C. after ageing on thin layer (ASTM D 2872): 4640 P;
viscosity increase: 46%.

The same bitumen without additive has the following characteristics:
viscosity before test: 1350 P;
viscosity after test: 2560 P;
viscosity increase: 90%.

EXAMPLE 3

Comparison

9% of the SBS polymer used in the preceding examples is added to a 180/200 bitumen and dispersed with a turbine mixer at 180° C. The mixture is then stirred for 2 hours at 200° C.

After 24 hours it is observed that phase separation has already occurred, the softening point being 115° C. at the top and 96° C. at the bottom.

After 120 hours storage at 170° C., phase separation is confirmed, the softening point being 117° C. at the top and 60° C. at the bottom.

EXAMPLE 4

Comparison

The SBS polymer used in the preceding examples is grafted with 7% of maleic anhydride. The modified polymer obtained is added to the extent of 6% to a mixture of 180/200 and 80/100 bitumen. The mixture is homogenized with a turbine mixer at 190° C. for 30 minutes.

The resultant mixture has the following characteristics:
- penetration: 83 dmm;
- ball ring: 45.8° C.;
- penetration index: −1.08;
- after 24 hours storage at 170° C., the softening point of the top is 88° C. whereas that of the bottom is 45° C.

EXAMPLE 5

Comparison

An 80/100 bitumen is treated at 250° C. for 90 minutes under nitrogen with 4% of the SBS polymer used in the preceding tests.

The resultant mixture has the following characteristics:
- penetration: 75 dmm;
- ball ring: 58° C.;
- penetration index: 1.73;
- Fraass brittle point: −17° C.

EXAMPLE 5 bis

Comparison 95.7 parts of a bitumen mixture consisting of 65% of an 80/100 bitumen and 35% of a 180/200 bitumen are treated with 4.3 parts of the previously used SBS polymer for 75 minutes at 250° C. under nitrogen.

The resultant mixture has the following characteristics:
- penetration: 85 dmm;
- ball ring: 59° C.;
- penetration index: 2.34.

The data of Examples 5 and 5bis are compared with those given for the mixture L. It can be seen that by treating a mixture of bitumen and SBS with maleic anhydride and then diluting with fresh bitumen, bitumens are obtained which besides being storage stable have decidedly better performance than those treated only with SBS polymer.

I claim:

1. A process for storage-stabilizing bitumen mixtures containing added thermoplastic polymer and for improving their general characteristics, characterised by reacting said bitumen mixtures and polymer with an unsaturated dicarboxylic aliphatic acid or with the relative anhydride, in an inert environment, at a temperature of at least 190° C. and until stable mixtures are obtained.

2. A process as claimed in claim 1, characterised in that the reaction temperature is comprised within the range of from 190° C. to 240° C. and the reaction times are comprised within the range of from 2 to 6 hours.

3. A process as claimed in claim 1, characterised in that both the initial bitumen and that subsequently used for possible dilution, and which can be the same or different, are of the type normally used for roads, they being chosen on the basis of suitable applicational criteria, and can be prepared by mixing together different bitumens or bitumens and other products, of petroleum origin or not.

4. A process as claimed in claim 1, characterised in that the polymer to be added to the bitumen pertains to the thermoplastic elastomer class, and is a block copolymer consisting of blocks of vinyl-aromatic monomer units and blocks of conjugated diene monomer units.

5. A process as claimed in claim 4, characterised in that the thermoplastic elastomer is a block copolymer consisting of polystyrene blocks and blocks of a polymerized unsaturated diene, the percentage of polystyrene blocks being between 20 and 40%.

6. A process as claimed in claim 5, characterised in that the molecular weight of said block copolymer is between 50,000 and 1,000,000.

7. A process as claimed in claim 1, characterised in that the useful quantity of polymer to be added is between 2 and 20% by weight.

8. A process as claimed in claim 1, characterised in that the unsaturated dicarboxylic aliphatic acid is maleic acid.

9. A process as claimed in claim 1, characterised in that the useful quantity of said unsaturated dicarboxylic acid or the relative anhydride is generally between 0.5 and 20% by weight.

10. A process as claimed in claim 4, wherein the polymerized unsaturated diene is comprised of polybutadiene.

11. A process as claimed in claim 4, wherein the percentage of polystyrene blocks is between 25 and 35%.

12. A process as claimed in claim 6, wherein the molecular weight of the block copolymer is between 100,000 and 800,000.

13. A process as claimed in claim 7, wherein the quantity of polymer added is between 4 and 15% by weight.

14. A process as claimed in claim 1, wherein the anhydride is maleic anhydride.

15. A process as claimed in claim 9, wherein the quantity of unsaturated dicarboxylic acid is between 2 and 12% by weight.

* * * * *